United States Patent
Kim et al.

(10) Patent No.: US 7,966,017 B2
(45) Date of Patent: Jun. 21, 2011

(54) METHOD AND APPARATUS FOR PERFORMING HANDOVER OF USER EQUIPMENT (UE) DURING DISCONTINUOUS RECEPTION (DRX) OPERATION IN MOBILE COMMUNICATION SYSTEM

(75) Inventors: Soeng-Hun Kim, Suwon-si (KR); Gert Jan Van Lieshout, Middlesex (GB); Kyeong-In Jeong, Hwaseong-si (KR); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 872 days.

(21) Appl. No.: 11/873,237

(22) Filed: Oct. 16, 2007

(65) Prior Publication Data

US 2008/0090573 A1 Apr. 17, 2008

(30) Foreign Application Priority Data

Oct. 16, 2006 (KR) .................. 10-2006-0100542

(51) Int. Cl.
  *H04W 36/00* (2009.01)
  *H04W 24/00* (2009.01)
  *H04W 4/00* (2009.01)
  *H04B 1/38* (2006.01)
(52) U.S. Cl. ............... 455/436; 455/456.4; 455/574; 455/432.1; 370/331; 370/328
(58) Field of Classification Search .......... 455/436–444, 455/456.4, 574, 525; 370/331–334
See application file for complete search history.

(56) References Cited

U.S. PATENT DOCUMENTS 6,490,453 B1 12/2002 Lee et al.
(Continued)

FOREIGN PATENT DOCUMENTS

KR 1020030031420 4/2003
(Continued)

OTHER PUBLICATIONS

Ericsson: "On the Issue of Forward Handover in LTE", 3GPP Draft; R2-062863, 3rd Generation Partnership Project (3GPP), Oct. 5, 2006.

(Continued)

*Primary Examiner* — Kamran Afshar
*Assistant Examiner* — Kathy Wang-Hurst
(74) *Attorney, Agent, or Firm* — The Farrell Law Firm, P.C.

(57) ABSTRACT

A method and apparatus for increasing the success rate of a handover of a connected mode UE while minimizing the power consumption of the UE during DRX operation in a mobile communication system is provided. The method includes the steps of transmitting a cell change report to the serving base station, and then suspending the DRX operation to transition to an active mode; receiving a handover command message, and completing the handover to a target cell; checking if the handover command message includes a DRX resume command; waiting until a control message including the DRX resume command is received from the target base station; and after the control message including the DRX resume command is received, transitioning from the active mode to a sleep mode, and resuming the DRX operation.

11 Claims, 6 Drawing Sheets

U.S. PATENT DOCUMENTS

| | | | |
|---|---|---|---|
| 2002/0006805 A1* | 1/2002 | New et al. | 455/525 |
| 2003/0117966 A1 | 6/2003 | Chen | |
| 2004/0043798 A1 | 3/2004 | Amerga et al. | |
| 2005/0032555 A1* | 2/2005 | Jami et al. | 455/574 |
| 2007/0291729 A1* | 12/2007 | Dalsgaard et al. | 370/347 |

FOREIGN PATENT DOCUMENTS

| | | |
|---|---|---|
| WO | WO 02/07459 | 1/2002 |
| WO | WO 03/032509 | 4/2003 |
| WO | WO 2005/067180 | 7/2005 |

OTHER PUBLICATIONS

Qualcomm Europe: "Handover Considerations", 3GPP Draft; R2-061839, 3rd Generation Partnership Project (3GPP), Jun. 21, 2006.

NTT DoCoMo: "RRC Re-establishment Procedure", 3GPP Draft; R2-061928, 3rd Generation Parnership Project (3GPP), Jun. 22, 2006.

Samsung: "DRX Stop & Resume", 3GPP Draft; R2-086614, 3rd Generation Partnership Project (3GPP) Nov. 4, 2008.

* cited by examiner

METHOD AND APPARATUS FOR PERFORMING HANDOVER OF USER EQUIPMENT (UE) DURING DISCONTINUOUS RECEPTION (DRX) OPERATION IN MOBILE COMMUNICATION SYSTEM

PRIORITY

This application claims priority under 35 USC §119 to an application entitled "Method and System for Performing Handover of Connected Mode UE During DRX Operation in Mobile Communication System" filed in the Korean Industrial Property Office on Oct. 16, 2006 and assigned Serial No. 2006-0100542, the contents of which are incorporated herein by reference.

BACKGROUND OF THE INVENTION

1. Field of the Invention

The present invention relates to a mobile communication system, and more particularly to a method and apparatus for performing a handover of a user equipment in connected mode during discontinuous reception operation in a mobile communication system.

2. Description of the Related Art

The UMTS (Universal Mobile Telecommunication Service) system is a $3^{rd}$ generation asynchronous mobile communication system that is based on European Mobile Communication Systems, i.e., GSM (Global System for Mobile Communications) and GPRS (General Packet Radio Services), and employs a WCDMA (Wideband Code Division Multiple Access) scheme. The 3GPP ($3^{rd}$ Generation Partnership Project) responsible for UMTS standardization is currently discussing LTE (Long Term Evolution) as a next generation UMTS system.

In the conventional $3^{rd}$ generation mobile communication system, that is, the UMTS system, one way to minimize the power consumption of a user equipment (UE) in an idle mode is discontinuous reception (DRX) operation in which the UE discontinuously receive a paging message. The idle mode UE turns on its transceiver, wakes up from a sleep state, and monitors a paging channel at a predetermined point in time. If a paging message specific to the UE is received over the paging channel, the UE transitions to a connected mode. In contrasts, if a UE-specific paging message is not received over the paging channel, the UE turns off its transceiver, and maintains the sleep state until it wakes up next time.

In this way, the conventional $3^{rd}$ generation mobile communication system applies the DRX operation of the UE only to the paging message. The reason for this is that voice communication is the first consideration in the conventional mobile communication system, and thus the period of time during which the UE stays in the connected mode is relatively short.

However, a new evolved mobile communication system, such as LTE, is expected to provide a UE with a voice packet service as well as a voice communication service. Since such a UE that is provided with the voice packet service may stay in a connected mode for a relatively long period of time, the problem of minimizing the power consumption of the UE in the long connected mode needs to be fundamentally solved.

In the evolved mobile communication system, a network may appropriately set the DRX operation for the connected mode UE by considering the characteristics of a service that is being provided.

However, when the DRX operation is set for the connected UE in this way, the UE's handover may deteriorate due to the DRX operation. In other words, the UE in the sleep state cannot receive a handover command from a base station during the DRX operation, resulting in the UE to finally fail in a handover.

Therefore, there is a need for a scheme to provide timely handover, which can maximize the system performance of a connected mode UE while minimizing the power consumption of the UE during DRX operation in the evolved mobile communication system.

SUMMARY OF THE INVENTION

Accordingly, the present invention has been made to solve at least the above-mentioned problems occurring in the prior art, and provides a method and apparatus for performing a handover of a UE in connected mode while minimizing the power consumption of the UE in a mobile communication system.

Further, the present invention provides a method and apparatus for receiving a handover command for a connected mode UE during DRX operation in a mobile communication system.

Further, the present invention provides a method and apparatus for performing a handover of a UE in connected mode between base stations during DRX operation in a mobile communication system.

In accordance with an aspect of the present invention, there is provided a method for performing a handover of a UE in connected mode from a serving base station to a target base station during DRX operation in a mobile communication system. The method includes transmitting a cell change report to the serving base station in which the UE is located, and then suspending the DRX operation to transition to an active mode; receiving a handover command message transmitted from the serving base station, and completing the handover to a target cell under the control of the target base station; checking if the handover command message includes a DRX resume command; waiting until a control message including the DRX resume command is received from the target base station if the DRX resume command is included in the handover command message; and after the control message including the DRX resume command is received, transitioning from the active mode to a sleep mode, and resuming the DRX operation.

In accordance with another aspect of the present invention, there is provided an apparatus for performing a handover of a UE in connected mode from a serving base station to a target base station during DRX operation in a mobile communication system. The apparatus includes a transceiver for receiving a DRX parameter, a cell change parameter, and measurement type information based on which the DRX operation is suspended; a DRX controller for turning the transceiver on/off by using the received DRX parameter; and a radio resource control entity for measuring reception qualities for neighboring cells through the cell change parameter, applying a control signal corresponding to a result of the measuring to the DRX controller to turn on the transceiver and report a cell change to the serving base station, and then controlling the UE to perform the handover to the target base station.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENT

Figure 1:
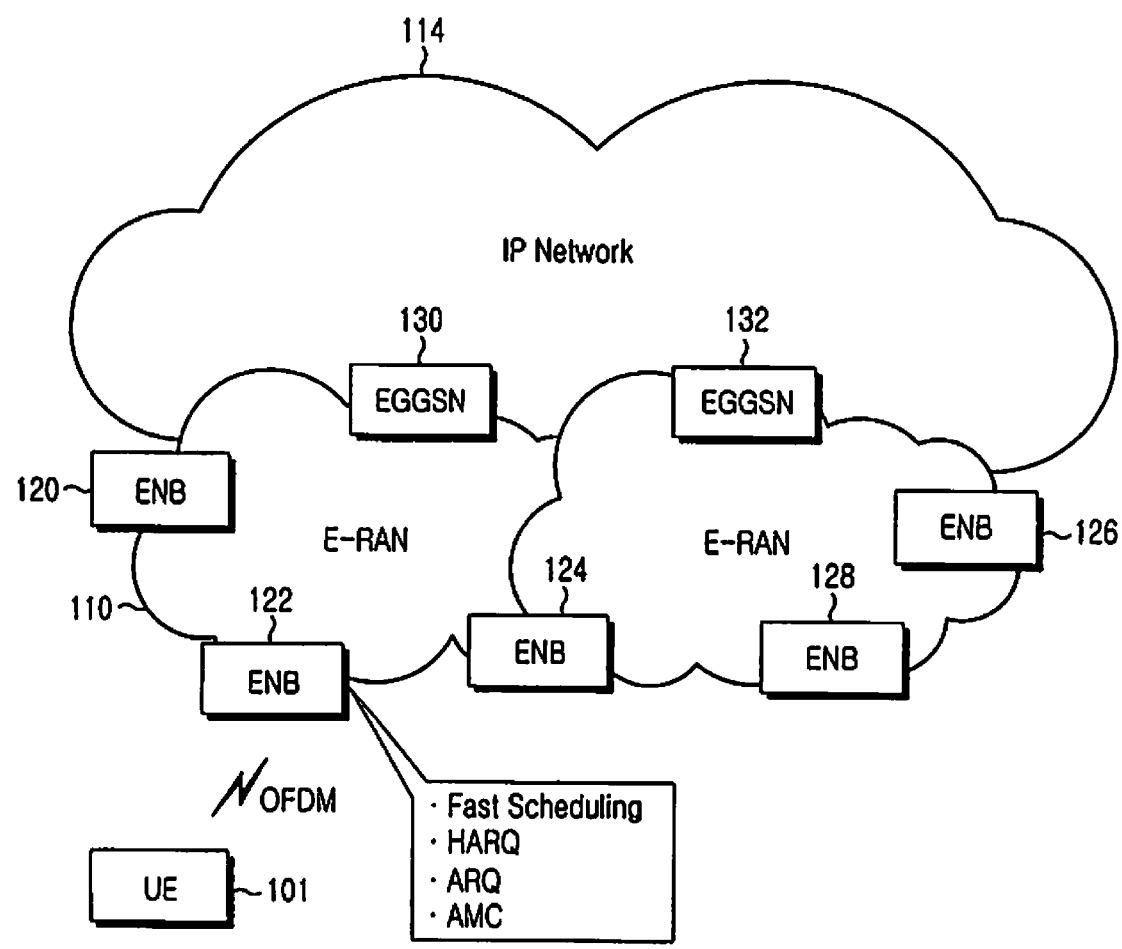
FIG. 1 is a system overview of an Evolved Mobile Communication System to which the present invention is applied.

Hereinafter, preferred embodiments of the present invention will be described with reference to the accompanying drawings. In the following description, the same elements will be designated by the same reference numerals although they are shown in different drawings. Further, in the following description, only parts necessary for understanding operations of the present invention will described, and a detailed description of known functions and configurations incorporated herein will be omitted because the subject matter of the present invention may become unclear.

The present invention discloses a way to perform a handover of UE in connected mode between base stations while increasing the success rate of the handover, the power consumption of which is to be minimized by using DRX operation. Upon reporting a measurement result indicative of a high probability of triggering a handover to a base station during DRX operation, a connected mode UE suspends the DRX operation set for the UE, receives a handover command from the base station, and then resumes the DRX operation after the handover is completed.

Accordingly, the present invention provides a method and apparatus for minimizing deterioration in handover performance, which may be caused by delay of control message reception in performing a handover of a connected mode UE during DRX operation.

Hereinafter, by way of example, the present invention will be described based on a LTE (Long Term Evolution) system, thus a brief description of the LTE system will be given first.

LTE with an aim to reach commercialization by around 2010 is technology for implementing high-speed packet-based communication of about 100 Mbps. To this end, various plans are under discussion, including a plan to reduce the number of nodes located on a communication path by simplifying the network architecture, and a plan to approximate wireless protocols to a radio channel as close as possible, and so forth.

Referring to FIG. 1, an evolved radio access network (hereinafter referred to as "E-RAN") 110 has a simplified two node structure of an evolved Node B (hereinafter referred to as "ENB" or "Node B") 120, 122, 124, 126, 128 and an anchor node 130, 132. A User Equipment (UE) 101 is connected to an Internet Protocol (IP) via E-RAN 110.

ENB 120 to 128 corresponds to an existing Node B of the UMTS system, and is connected to UE 101 over a radio channel. Dissimilar to the existing Node B, ENB 120 to 128 are expected to perform more complex functions. Particularly, since all user traffics including a real-time service through an IP, such as a VoIP (Voice over IP) service, are serviced via a shared channel in LTE, the ENB performs scheduling after collecting situation information of UEs, and takes charge in functions related to Radio Resource Control. Also, control protocols, such as a Radio Resource Control (RRC) protocol, are provided in ENB 120 to 128.

In order to enable transmission speed of up to 100 Mbps, LTE is expected to employ Orthogonal Frequency Division Multiplexing (OFDM) scheme as radio access technology with a bandwidth of 20 MHz. It is also expected to apply Adaptive Modulation and Coding (AMC) scheme in which a modulation scheme and a channel-coding rate are determined adaptively to the channel state of a UE.

UE 101 reports a channel status to ENB 120 to 128 so as to apply the AMC. UE 101 is usually allocated a channel to be used for reporting the channel status while transitioning to a connected mode, and cyclically reports the channel status over the allocated channel.

In a communication system using base station scheduling, a base station scheduler may allocate a transmission resource to a UE, and then transmit/receive a user packet to/from the UE. A message for allocating the transmission resource is signaled to the UE over a predetermined channel. Hereinafter, the channel over which the transmission resource allocation message is transmitted will be referred to as a "grant channel" for the convenience of explanation.

In the OFDM scheme, a transmission resource refers to a specific frequency band that can be used for a specific period of time. Although still under discussion, the LTE system will divide the overall system frequency band into 24 frequency bandwidths and use them, as transmission resources, and a base station will allocate a part of the 24 divided bandwidths to a UE such that the UE uses the allocated bandwidth for 0.5 msec. A transmission resource allocation message may be configured in such a manner as to include the following information:

UE Identifier: identifier of UE to be allocated transmission resource;

Transmission Resource Information: transmission resource allocated to UE;

Others: other information, such as length of duration during which transmission resource is effective.

If a UE receives a transmission resource allocation message including its own identifier over a grant channel, it receives/transmits data through an allocated transmission resource.

During DRX operation, a connected mode UE wakes up from a sleep state and monitors a given channel, for example, a grant channel, at a predetermined point of time. If there is data to be transmitted to the UE, a base station allocates a transmission resource to the UE and transmits the data over the grant channel. Upon completing transmitting/receiving the data, the UE transitions to the sleep state again, and maintains the sleep state until it is awaken next time.

Figure 2:
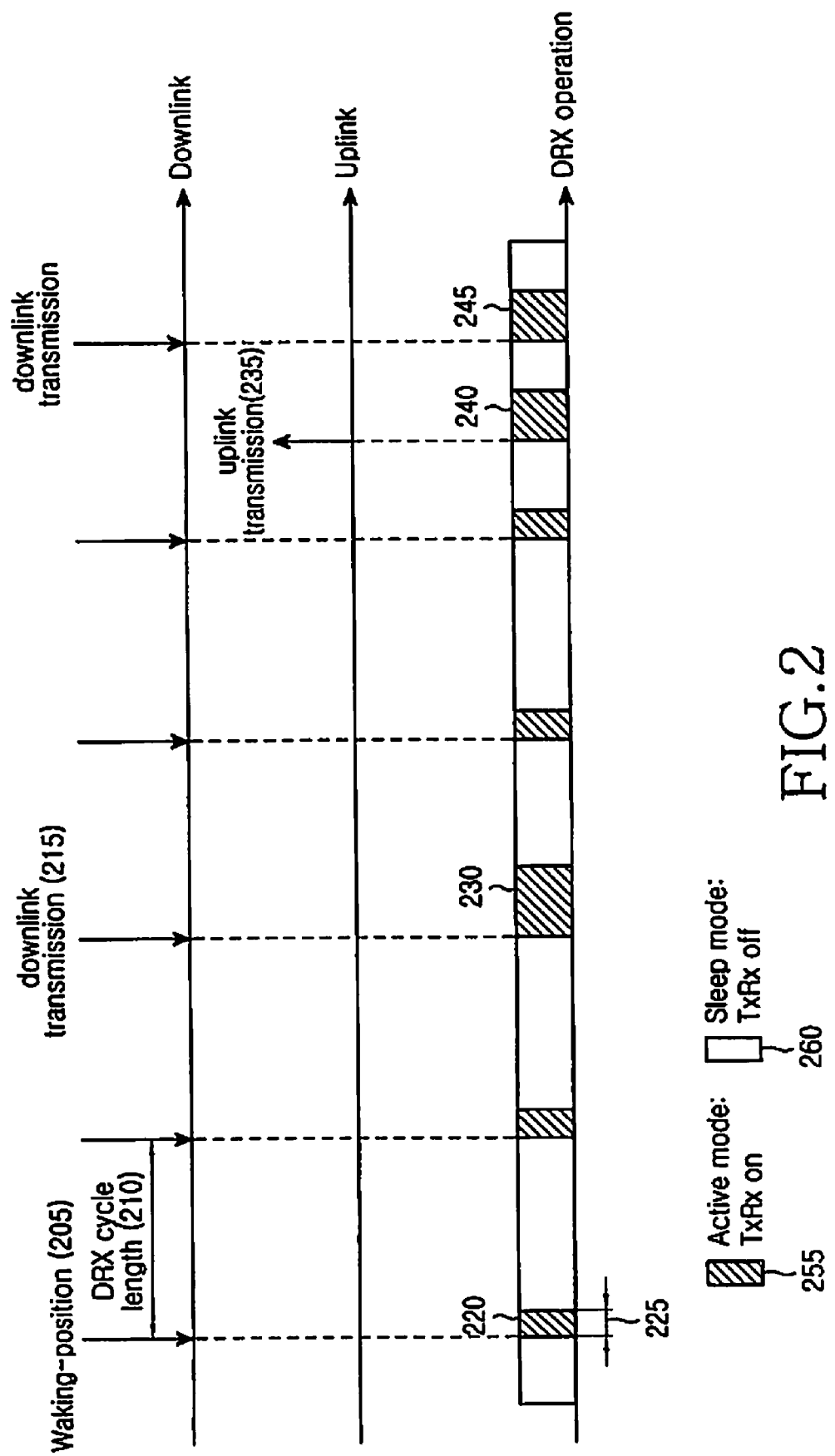
FIG. 2 illustrates a DRX operation of a connected mode UE to which the present invention is applied.

With regard to this, FIG. 2 illustrates DRX operation of a connected mode UE to which the present invention is applied.

For the convenience of explanation, terms to be used herein are defined as follows:

Wakeup Time 205: point of time when UE wakes up from sleep state and begins monitoring a specific channel.

DRX Cycle Length 210: period of time between wakeup time and next wakeup times. Base station selects appropriate DRX cycle length according to service types. That is, long DRX cycle length is used for services insensitive to delay, and short DRX cycle length is used for services sensitive to delay.

t225: minimum period of time during which transmission resource is received over grant channel.

Active Mode 255: mode in which UE turns on transceiver to receive downlink data or transmits uplink data. If UE begins receiving downlink data at wakeup time or transmitting uplink data at arbitrary time over specific channel, it transitions to active mode.

Sleep Mode 260: mode in which UE turns off transceiver to minimize power consumption. In call setup process, base station signals information by which UE can calculate wakeup time. In general, wakeup time is calculated by the following Equation (1):

$$\text{wakeup time} = \text{initial wakeup tim} + n * DRX \text{ cycle length} \quad (1)$$

The initial wakeup time is generally calculated using invariable information like the UE identifier, etc., and the DRX cycle length is set according to service types and is notified to a UE by a base station. For example, when a service is of a type in which traffic is intermittently generated and which is insensitive to delay, the UE uses a relatively long DRX cycle length up to several hundreds of msec. In contrast to this, when a service is of a type sensitive to delay, the UE uses a DRX cycle length capable of satisfying delay requirements.

The UE wakes up at each wakeup time 205, and transitions to the active mode 255 to monitor the grant channel. If there is no data to be transmitted to the UE at a certain wakeup time, transmission resource allocation information for the UE will not be transmitted over the grant channel. Thus, when the UE cannot receive the transmission resource allocation information over the grant channel, it transitions to the sleep mode 260 and maintains it until the next wakeup time is reached.

If there is data to be transmitted to the UE at any wakeup time, the UE calculates wakeup times by using DRX-related parameters signaled from a network, and can monitor and check the grant channel at each wakeup time.

That is, if data to be transmitted to the UE is available, the base station transmits transmission resource allocation information to the UE over the grant channel at a wakeup time 215 of the UE. The UE receives downlink data through the allocated transmission resource, and if the downlink data reception is completed, the UE transitions to sleep mode 230 and maintains it until the next wakeup time is reached.

If UE-specific uplink data becomes available, as designated by reference numeral "235", in the middle of repeating the aforementioned procedure in which the UE monitors the grant channel and receives data, if any, the UE transitions to the active mode and maintains it until the uplink data transmission is completed, as designated by reference numeral "240".

In this way, the UE maintains the active3 mode during the downlink data reception or the uplink data transmission, and maintains the sleep mode during remaining period of time, thereby minimizing power consumption.

As described in FIG. 2, when a UE moves to the outskirt of a current cell and thus needs to perform a handover, it may not timely receive a handover command transmitted from a base station if it remains in the DRX operation, which results in failure in the handover.

A handover procedure can be summarized as follows:
1. UE moves toward target cell.
2. Reception quality of target cell becomes better than that of current cell.
3. UE transmits measurement report indicating best cell change (i.e., cell having best reception quality is changed) to base station.
4. Base station determines handover to target cell, and performs handover preparation process together with target cell.
5. Upon completing handover preparation process, base station of current cell transmits handover command message to UE.
6. UE performs handover to target cell.

If a UE, which maintains DRX operation is to perform such a handover procedure, t the time when the UE can receive a handover command message is limited to wakeup times, as a result of which a time delay corresponding to a half of DRX cycle length on an average is added to transmission/reception of the handover command message. If the DRX cycle length is very large, the added time delay may result in handover failure.

Therefore, according to the present invention, in order to solve this problem, a UE suspends DRX operation after completing transmitting a measurement report indicative of a high probability of triggering a handover, and resumes the DRX operation after the handover is completed. Here, an example of the measurement report indicating that a probability of triggering a handover is high may be a measurement report indicating a best cell change.

Figure 3:
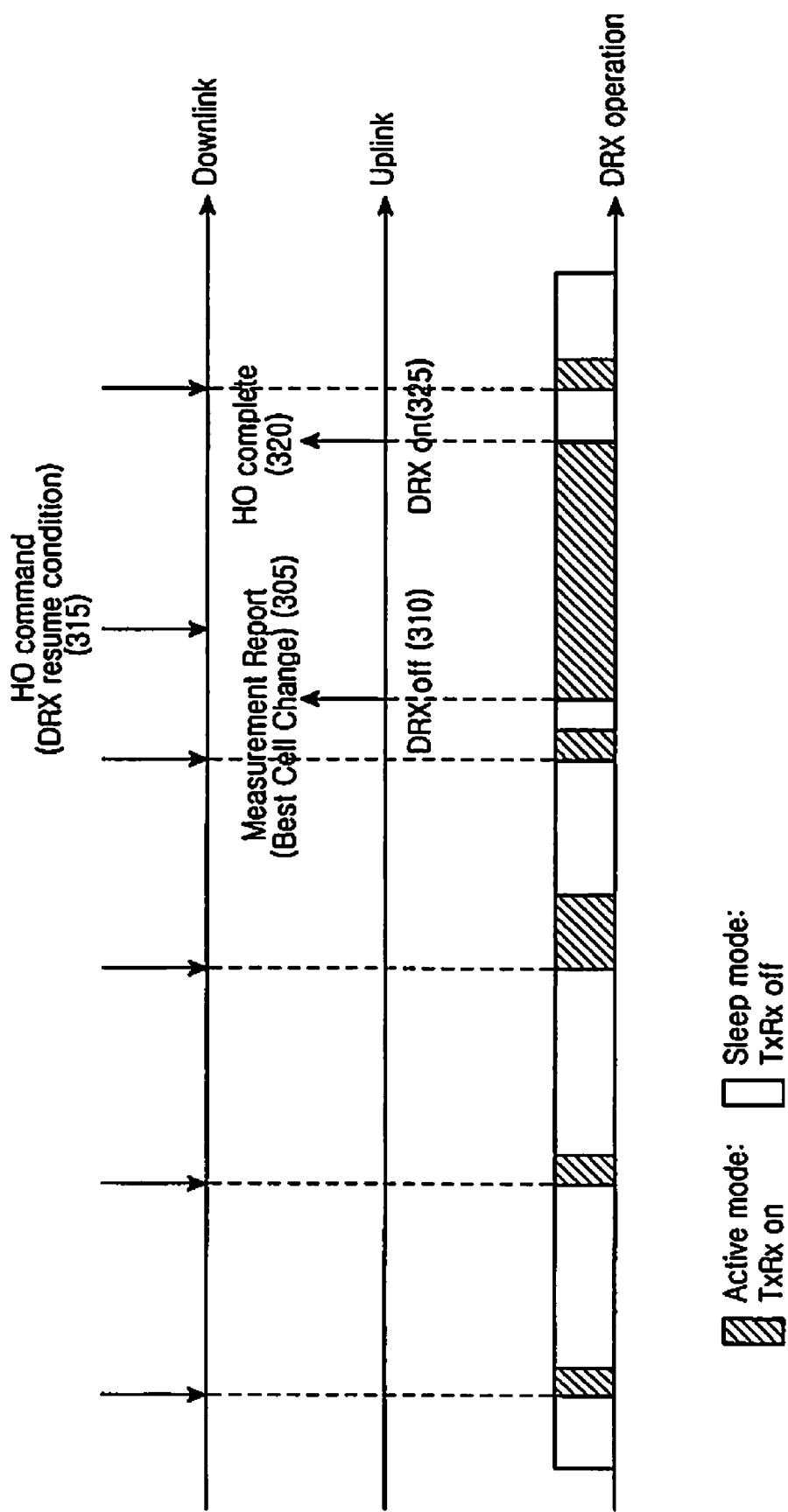
FIG. 3 illustrates a procedure in which a connected mode UE suspends and then resumes a DRX operation in the process of a handover in accordance with the present invention.

Referring to FIG. 3, a measurement report indicating a best cell change is transmitted/received between a UE and a base station, as designated by reference number "305", DRX operation between the UE and the base station is suspended, as designated by reference number "310".

In other words, the UE continue to turn on its transceiver, and if data is to be transmitted to the UE, the base station promptly transmits the data without waiting until the UE reaches a wakeup time.

Since the UE reports the best cell change, the base station normally performs a handover preparation process together with a new target cell, that is, the best cell, in order to implement a handover to the target cell, and if the handover preparation process is completed, the base station transmits a handover command message to the UE, as designated by reference number "315". With regard to this, the base station can transmit the handover command message as soon as the message occurs because the UE suspends the DRX operation after reporting the base cell change. The handover command message includes target cell information and other information necessary for performing the handover. Also, the handover command message includes a DRX resume condition based on which the UE resumes the DRX operation.

Upon receiving the handover command message, the UE acquires downlink and uplink synchronizations with the target cell, the UE is allocated a transmission resource for transmitting a handover completion message, and then transmits the handover completion message, as designated by reference number "320". If the handover procedure is completed, the DRX operation is resumed between the UE and a base station of the target cell. The time when the handover procedure is completed may be classified into two cases based upon the circumstances:

Case 1: when the UE performs a handover in which core network-related information need not be updated, handover is completed at the time when transmission of handover completion message is completed.

Case 2: when the UE performs handover in which core network-related information need be updated, the UE completes handover after completing transmission of handover completion message and receiving new core network-related information from network.

Consequently, if the UE performs a handover corresponding to Case 1, it can resume the DRX operation immediately after completing transmission of the handover completion message. On the contrary, if the UE performs a handover corresponding to Case 2, it cannot resume the DRX operation before completing transmission of the handover completion message and receiving downlink control message including new core network-related information. Thus, it is preferred to resume the DRX operation differently according to the types of a handover.

In order to resume the DRX operation at a different time according to the type of a handover, the base station includes DRX resume condition in the handover command message. The DRX resume condition is classified into two types:

Condition 1: In case of handover in which the handover procedure is completed after the UE transmits the handover completion message, the base station transmits the signals for Condition 1. UE resumes DRX operation after completing transmission of handover completion message.

Condition 2: In case of handover in which the handover procedure is completed after the downlink control message including core network-related information is received, the base station transmits the signals for Condition 2.

The UE resumes the DRX operation after receiving a DRX resume command from the base station.

Here, FIG. 3 illustrates signaling corresponding to Condition 1 by way of example.

Figure 4:
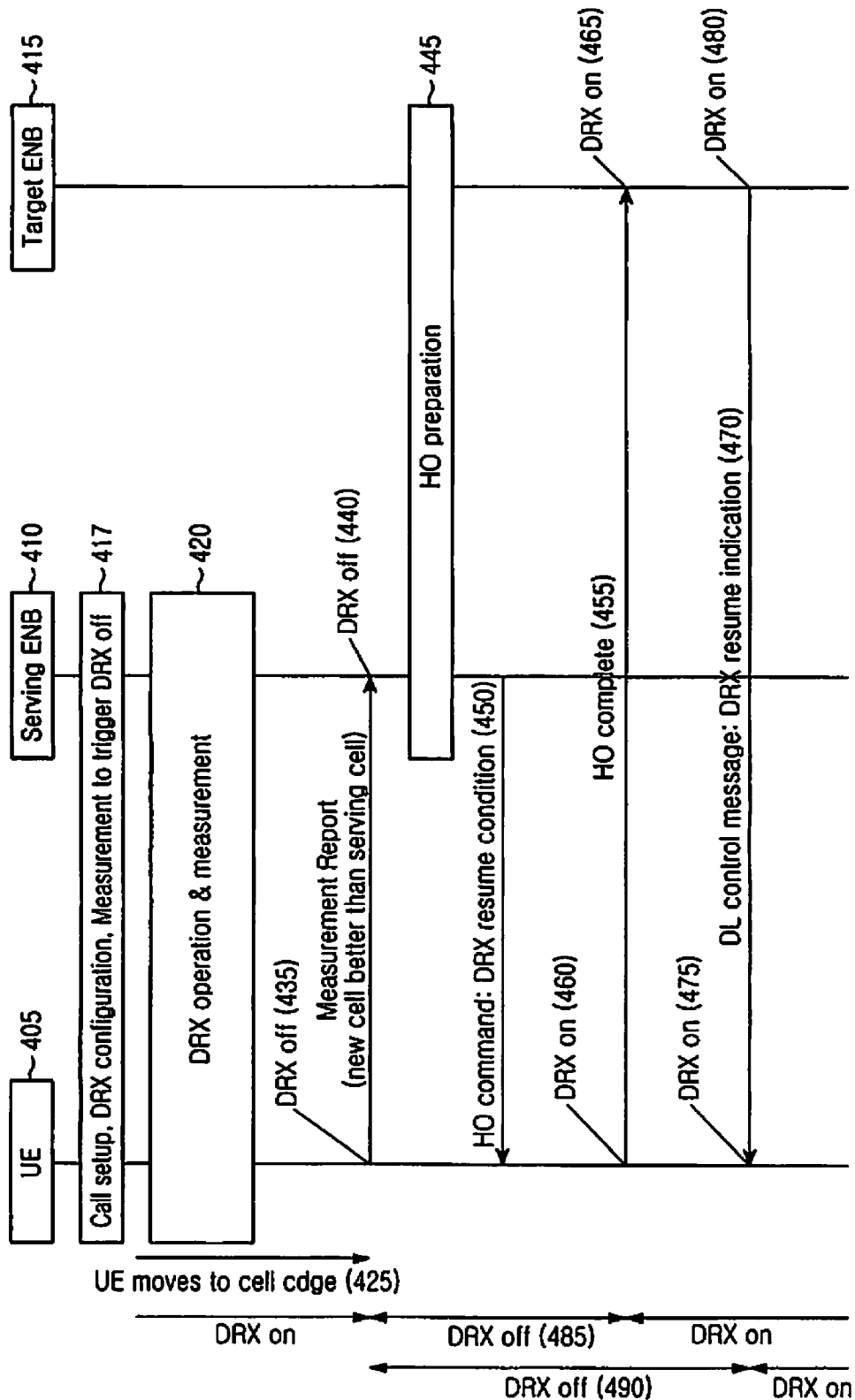
FIG. 4 illustrates the overall handover procedure between a connected mode UE and base stations in accordance with the present invention.

Referring to FIG. 4, in a mobile communication system including a UE 405, a current serving ENB 410, and a target ENB 415, serving ENB 410 transmits the signals for DRX-related parameters, measurement-related parameters, and a measurement report type to suspend DRX operation, etc. to the UE during a call setup process, as designated by reference number "417".

Here, the DRX-related parameters may include a DRX cycle length, a wakeup time, and the like. Also, the measurement-related parameters may include neighboring cell information, the type of a measurement report from the UE, and so forth. The measurement report includes the following types:

Common pilot channel quality of any cell among neighboring cells exceeds predetermined threshold.

Common pilot channel quality of any neighboring cell, which has exceeded predetermined threshold, falls below threshold.

Common pilot channel quality of any cell among neighboring cells becomes better than that of current cell (hereinafter referred to as "new cell better than serving cell type").

Cell having best common pilot channel quality is changed (hereinafter referred to as "best cell change type").

Among various measurement report types as mentioned above, serving ENB 410 may set a measurement report type indicating a high probability of triggering a handover as a measurement report type to suspend DRX operation. For example, the best cell change type or the new cell better than serving cell type may be defined as the measurement report type to suspend DRX operation.

Upon completing call setup, UE 405 performs DRX operation and a series of measurement operations by using the DRX-related parameters and the measurement-related parameters, as designated by reference number "420".

In the meantime, if the UE moves toward a target cell, the common pilot channel quality of the target cell is continually enhanced and finally becomes better than that of the current cell at any time, or the target cell becomes the best cell, the UE configures a measurement report of the new cell better than serving cell type or the best cell change type, and transits the configured measurement report to serving ENB 410, as designated by reference number "430".

In this case, since the measurement report is set to a type to suspend DRX operation, UE 405 suspends the DRX operation after transmitting the measurement report, as designated by reference number "435", and serving ENB 410 suspends the DRX operation after receiving the measurement report, as designated by reference number "440".

In other words, UE 405 continues to turn on its transceiver and monitors a downlink control channel. Also, as soon as data to be transmitted to the UE becomes available, serving ENB 410 promptly transmits the data irrespective of the DRX operation of the UE.

Since serving ENB 410 confirms from the measurement report type that the channel quality of the target cell is better than that of current base station 410, it determines a handover of the UE to the target cell, and performs a handover preparation process together with base station 415 of the target cell, as designated by reference number "445". Upon completing the handover preparation process, serving ENB 410 transmits a handover command message to the UE, as designated by reference number "450".

Since DRX operation is not set between UE 405 and serving ENB 410 at a time of process 450, serving ENB 410 transmits the handover command message to UE 405 as soon as the message is created.

Alternatively, since UE 405 continually monitors the downlink control channel after transmitting the measurement report to suspend the DRX operation, it can immediately detect the handover command message transmitted from serving ENB 410, and receives the handover command message through a predefined procedure in process 450.

UE 405 performs a handover to the target cell according to control information included in the handover command message, and transmits a handover completion message to target ENB 415 in the target cell, as designated by reference number "455".

If the handover command message is a message commanding the UE to perform a handover in which core network-related information need not be updated, the DRX resume condition of the handover command message is set to Condition 1. In this case, UE 405 resumes the DRX operation immediately after completing transmitting the handover completion message in process 455, as designated by reference numbers "460" and "465". If layer 2 Automatic Retransmission reQuest (ARQ) is applied to the handover completion message, completing transmission of the handover completion message means receiving a layer 2 ACK signal for the handover completion message. In other words, the UE receives a layer 3 ACK signal for the handover completion message, and then resumes the DRX operation according to the previous DRX cycle length.

In contrast to this, if the handover command message is a message commanding the UE to perform a handover in which core network-related information need be updated, the DRX resume condition of the handover command message is set to Condition 2. In this case, UE 405 monitors the downlink control channel without applying the DRX operation even after completing transmission of the handover completion message. If any downlink control message explicitly commanding the UE to perform the DRX operation is received, as designated by reference number "470", the UE resumes the DRX operation, as designated by reference numbers "475" and "480". If the layer 2 ARQ is similarly applied to the downlink control message, completing reception of the downlink control message means transmitting a layer 2 ACK signal for the downlink control message.

Figure 5:
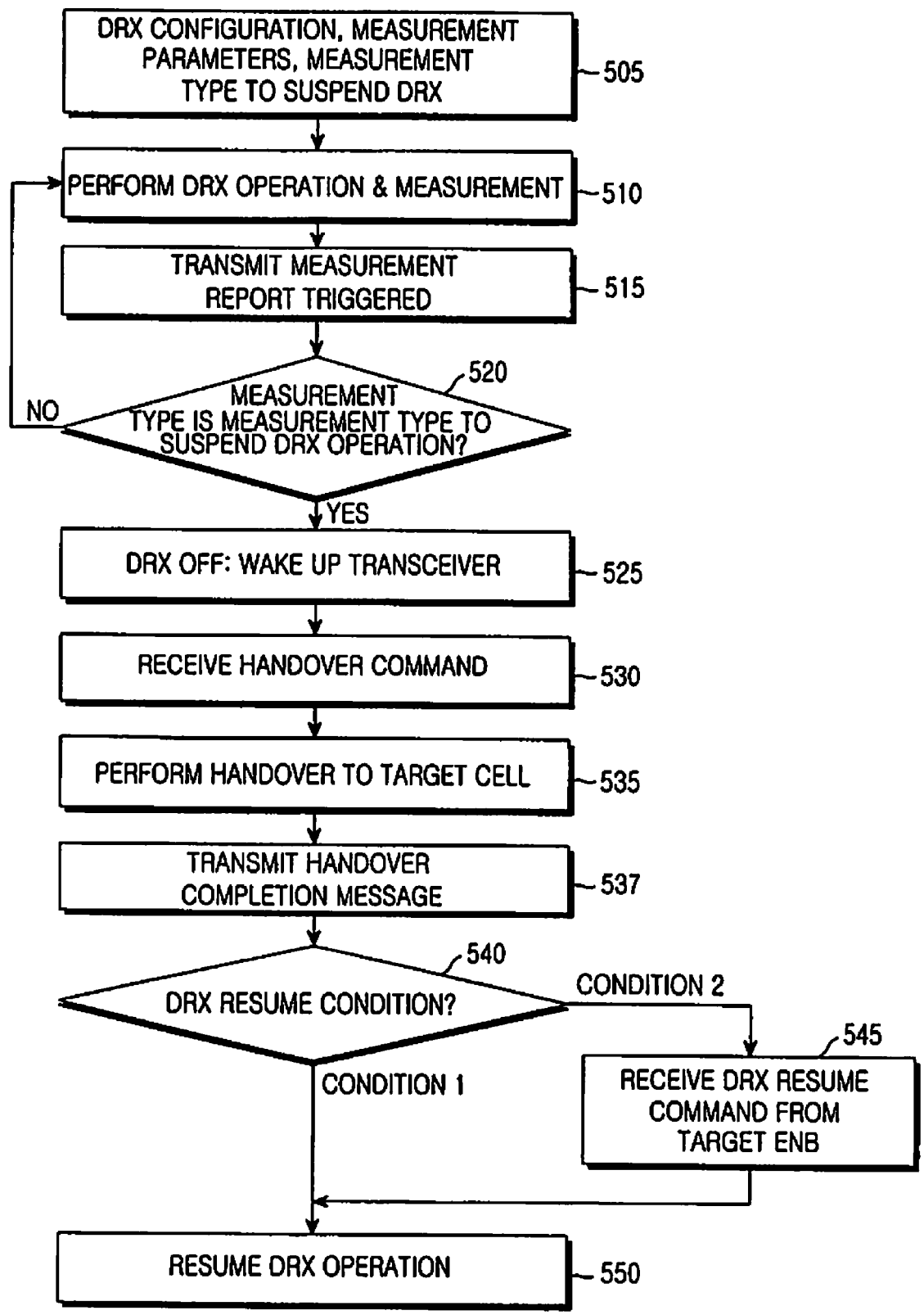
FIG. 5 is a flowchart for a procedure of performing a handover of a connected mode UE during DRX operation in accordance with the present invention.

Referring to FIG. 5, in step 505, a network signals to a UE a DRX-related parameters (DRX configuration), measurement-related parameters, and a measurement report type to suspend DRX operation. A predetermined type may be used as the measurement report type to suspend DRX operation without previously signaling it.

In step 510, performs predefined DRX and measurement operations.

In step 515, if the measurement operations results in a measurement report message, the UE transmits the measurement report message. In step 520, the UE checks if the type of the measurement report message is a measurement type to suspend the DRX operation. If the type of the measurement report message is not a measurement type to suspend the DRX operation, the UE returns to step 510, and continues to perform the predefined DRX and measurement operations.

On the contrary, if the type of the measurement report message is a measurement type to suspend the DRX operation, the UE proceeds to step 525, and suspends the DRX operation. In other words, the UE does not transition to a sleep mode and continues to turn on its transceiver even after transmission of the measurement report message is completed.

If the UE receives a handover command message in step 530, it performs the handover to a target cell in step 535, and transmits the handover completion message in step 537.

In step 540, the UE checks a DRX resume condition included in the handover command message. If the DRX resume condition is set to Condition 1, that is, if the UE is commanded to resume the DX operation after completing transmitting the handover completion message, it proceeds to step 550, and resumes the DRX operation.

However, if the DRX resume condition included in the handover command message is set to Condition 2, that is, if the UE is commanded to resume the DRX operation after receiving a DRX resume command from a network, it proceeds to step 545, and waits until a control message including the DRX resume command is received from a target ENB. If the control message including the DRX resume command is received, the UE proceeds to step 550, and resumes the DRX operation.

Figure 6:
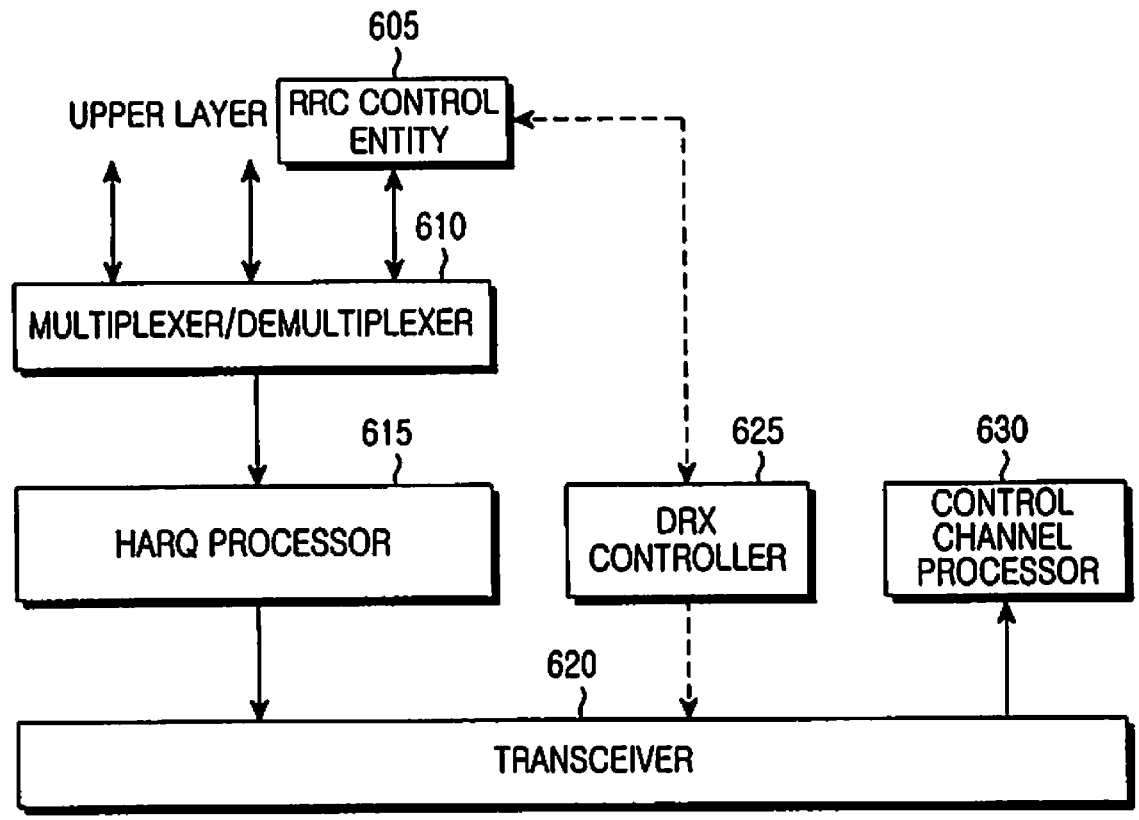
FIG. 6 is a block diagram illustrating a structure of a UE in accordance with the present invention.

Referring to FIG. 6, the UE includes an RRC entity 605, a multiplexer/demultiplexer 610, an HARQ processor 615, a transceiver 620, a DRX controller 625, and a control channel processor 630.

DRX controller 625 turns transceiver 620 on/off.

DRX controller 625 calculates wakeup times by using DRX-related parameters, and then turns on a receiver section of transceiver 620 at each wakeup time. If an active mode is terminated, DRX controller 625 turns off transceiver 620 until the next wakeup time is reached. Also, DRX controller 625 under the control of the RRC control entity 605 suspends DRX operation and maintains transceiver 620 in the on-state even after the active mode is terminated.

HARQ processor 615 processes an HARQ packet received by transceiver 620 through a predefined HARQ operation, and transmits a non-erroneous packet to demultiplexer 610.

Demultiplexer 610 demultiplexes a received HARQ packet to an appropriate upper layer. Data occurring in the upper layer is multiplexed into one packet in multiplexer 610, and HARQ processor 615 transmits the packet to a base station through the predefined HARQ operation.

Upon receiving transmission resource information over a control channel, control channel processor 630 controls transceiver 620 to perform a transmission/reception operation by using an allocated transmission resource.

RRC control entity 605 measures the reception qualities of specific neighboring cells under the control of a base station, and reports the result to an RRC control entity of the base station. If the measurement report is of a type indicating a high probability of triggering a handover, RRC control entity 605 controls DRX controller 625 to suspend DRX operation.

That is, RRC control entity 605 controls DRX controller 625 to turn on transceiver 620 so as to suspend the DRX operation, and to turn off transceiver 620 so as to resume the DRX operation after a handover procedure is completed.

Further, RRC control unit 605 checks a DRX resume condition that is included in a handover command message transmitted from a serving base station. If the DRX resume condition is set to Condition 1, that is, if the target base station commands RRC control entity 605 to resume the DRX operation after transmission of a handover completion message is completed, RRC control entity 605 controls DRX controller 625 to turn off transceiver 620 and resume the DRX operation.

Conversely, if the DRX resume condition included in the handover command message is set to Condition 2, that is, RRC control entity 605 is commanded to resume the DRX operation after a DRX resume command is received from a network, RRC control entity 605 controls DRX controller 625 to continually turn on transceiver 620 and wait until a control message including the DRX resume command is received. If the control message including the DRX resume command is received, RRC control entity 605 controls DRX controller 625 to turn off transceiver 620 and resume the DRX operation.

As described above, when a connected mode UE applies DRX operation in order to support an evolved mobile communication system, it can timely receive a handover command from a serving cell. Therefore, a handover to a target cell with better channel quality than that of a current cell can be accurately performed.

In other words, the present invention has an advantage in that a handover to a target cell better than a current cell can be performed while ensuring minimum power consumption of a UE.

While the invention has been shown and described with reference to certain exemplary embodiments thereof, it will be understood by those skilled in the art that various changes in form and details may be made therein without departing from the spirit and scope of the invention as further defined by the appended claims.

What is claimed is:

1. A method of performing a connected mode handover of a user equipment (UE) from a serving base station to a target base station during discontinuous reception (DRX) operation in a mobile communication system, the method comprising the steps of:

transmitting, by the UE, a cell change report to the serving base station in which the UE is located, and then suspending the DRX operation to transition to an active mode;

receiving, by the UE, a handover command message transmitted from the serving base station, and completing the handover to a target cell under a control of the target base station;

checking, by the UE, if a DRX resume condition included in the handover command message is a first condition that performs additional procedures after the handover completion;

when the DRX resume condition is the first condition, waiting, by the UE, until a control message including a DRX resume command is received from the target base station; and transitioning, by the UE, from the active mode to a sleep mode, and resuming the DRX operation after the control message including the DRX resume command is received.

2. The method as claimed in claim 1, further comprising signaling a DRX-related parameter, a measurement-related parameter, a measurement type to suspend the DRX operation from a network to the UE during call setup.

3. The method as claimed in claim 2, wherein the DRX-related parameter comprises a period of the DRX and wakeup time information of the UE the measurement-related parameter comprises information of neighbor cells and information of a measurement report type, and the measurement type to suspend the DRX operation is included in the information of measurement report type and comprises information for reporting about a cell having a common pilot channel quality higher than a common pilot channel quality of a cell in which the UE is located in the neighbor cells or a cell having the highest common pilot channel quality in the neighbor cells.

4. The method as claimed in claim 2, further comprising:
calculating wakeup times by using the DRX-related parameter, and then transitioning to the sleep mode;
transmitting the measurement report message, and checking if the measurement report message corresponds to the measurement type to suspend the DRX operation when the UE wakes up at each wakeup time to perform a measurement operation according to the measurement-related parameter,, and as a result of the measurement operation, a measurement report message is generated; and
suspending the DRX operation, and continuing to turn on a transceiver of the UE when the measurement report message corresponds to the measurement type to suspend the DRX operation.

5. The method as claimed in claim 4, wherein the cell change report indicates that the measurement report message corresponds to the measurement type to suspend the DRX operation.

6. An apparatus for performing a handover of a connected mode UE from a serving base station to a target base station during DRX operation in a mobile communication system, the apparatus comprising:
a transceiver for receiving a DRX-related parameter, a measurement-related parameter, and measurement type information based on which the DRX operation is suspended;
a DRX controller for controlling the transceiver to be turned on/off by using the received DRX-related parameter; and
a radio resource control (RRC) entity for measuring reception qualities for neighboring cells through the measurement-related parameter, applying a control signal corresponding to a result of the measuring to the DRX controller to turn on the transceiver and report a cell change to the serving base station, and then controlling the UE to perform the handover to the target base station,
wherein the RRC entity checks a DRX resume condition included in a handover command message transmitted from the serving base station, controls the DRX controller to maintain the transceiver in an on-state until a control message including a DRX resume command is received from the target base station when the DRX resume condition is a first condition that performs additional procedures after the handover completion, and controls the DRX controller to turn off the transceiver after the control message is received.

7. The method as claimed in claim 1, further comprising determining that an additional procedure after the handover completion is not performed, transitioning from the active mode to the sleep mode, and resuming the DRX operation if the DRX resume condition is the first condition.

8. The method as claimed in claim 1, wherein the additional procedure is to update core network-related information.

9. The apparatus as claimed in claim 6, wherein the DRX-related parameter comprises a period of the DRX and wakeup time information of the UE, the measurement-related parameter comprises information of neighbor cells and information of a measurement report type, and the measurement type to suspend the DRX operation is included in the information of measurement report type and comprises information for reporting about a cell having a common pilot channel quality higher than a common pilot channel quality of a cell in which the UE is located in the neighbor cells or a cell having the highest common pilot channel quality in the neighbor cells.

10. The apparatus as claimed in claim 6, wherein the RRC entity determines that an additional procedure after the handover completion is not performed and controls the DRX controller to turn off the transceiver after the control message is received if the DRX resume condition is the first condition.

11. The method as claimed in claim 6, wherein the additional procedure is to update core network-related information.

* * * * *